US011783233B1

(12) United States Patent
Kudli et al.

(10) Patent No.: US 11,783,233 B1
(45) Date of Patent: Oct. 10, 2023

(54) DETECTION AND VISUALIZATION OF NOVEL DATA INSTANCES FOR SELF-HEALING AI/ML MODEL-BASED SOLUTION DEPLOYMENT

(71) Applicant: DIMAAG-AI, Inc., Fremont, CA (US)

(72) Inventors: Rajaram Kudli, Bengaluru (IN); Satish Padmanabhan, Sunnyvale, CA (US); Fuk Ho Pius Ng, Portland, OR (US); Nagarjun Pogakula Surya Prakash, Bangalore (IN); Ananda Shekappa Sonnada, Bangalore (IN)

(73) Assignee: DIMAAG-AI, Inc., Fremont, CA (US)

( * ) Notice: Subject to any disclaimer, the term of this patent is extended or adjusted under 35 U.S.C. 154(b) by 0 days.

(21) Appl. No.: 18/153,010

(22) Filed: Jan. 11, 2023

(51) Int. Cl.
*G06N 20/00* (2019.01)

(52) U.S. Cl.
CPC .................................. *G06N 20/00* (2019.01)

(58) Field of Classification Search
CPC ...................................................... G06N 20/00
See application file for complete search history.

(56) References Cited

U.S. PATENT DOCUMENTS

| | | | |
|---|---|---|---|
| 9,165,051 B2 | 10/2015 | Masud et al. | |
| 11,556,746 B1 * | 1/2023 | Dasgupta | G06F 18/24 |
| 2009/0030864 A1 | 1/2009 | Pednault et al. | |
| 2010/0205124 A1 | 8/2010 | Ben-Hur et al. | |
| 2016/0275414 A1 * | 9/2016 | Towal | G06F 18/214 |
| 2017/0147930 A1 * | 5/2017 | Bellala | G06N 5/04 |
| 2018/0330273 A1 | 11/2018 | Hu et al. | |
| 2018/0336439 A1 | 11/2018 | Kliger et al. | |
| 2019/0026430 A1 | 1/2019 | Grouchy et al. | |
| 2019/0377325 A1 | 12/2019 | Abreu | |
| 2020/0285997 A1 * | 9/2020 | Bhattacharyya | G06N 7/00 |
| 2020/0320402 A1 | 10/2020 | Yoon et al. | |
| 2021/0090736 A1 | 3/2021 | Innanje et al. | |
| 2022/0083900 A1 * | 3/2022 | Khanna | G06F 17/18 |
| 2022/0292308 A1 * | 9/2022 | Schwiep | G06F 18/213 |
| 2022/0319141 A1 | 10/2022 | Liu et al. | |

(Continued)

OTHER PUBLICATIONS

Ding, "An experimentalevaluationofnoveltydetectionmethods", Neurocomputing 135, 2014, pp. 313-327. (Year: 2014).*

(Continued)

*Primary Examiner* — Dave Misir
(74) *Attorney, Agent, or Firm* — Polygon IP, LLP

(57) ABSTRACT

A feature data segment may be determined by applying a feature segmentation model to a test data observation. The feature segmentation model may be pre-trained via a plurality of training data observations and may divide the plurality of training data observations into a plurality of feature data segments. A predicted target value may be determined by applying to a test data observation a prediction model pre-trained via a plurality of training data observations. One or more distance metrics representing a respective distance between the test data observation and the feature data segment along one or more dimensions may be determined. The one or more distance metrics may be represented in a user interface. An updated prediction model and an updated feature segmentation model that both incorporate the test data observation and the training data observations may be determined based on user input.

16 Claims, 14 Drawing Sheets

(56) References Cited

U.S. PATENT DOCUMENTS

2022/0358225 A1 11/2022 Gadde et al.
2022/0398737 A1 12/2022 Zhang et al.
2023/0076083 A1* 3/2023 Mishra ................ G06F 18/2321

OTHER PUBLICATIONS

U.S. Appl. No. 18/047,836, Non Final Office Action dated Feb. 21, 2023, 77 pgs.
U.S. Appl. No. 18/047,841, Non Final Office Action dated Mar. 3, 2023, 50 pgs.
Astolfi, et al., "Estimation of the effective and functional human cortical connectivity with structural equation modeling and directed transfer function applied to high-resolution EEG", Magnetic Resonance Imaging, vol. 22, Issue 10, 2004, pp. 1457-1470, ISSN 0730-725X (Year: 2004).
Bagozzi, et al., "On the evaluation of structural equation models", Journal of the Academy of Marketing Science, vol. 16, 1988, p. 74-94 (Year: 1988).
Penny, et al., "Modelling functional integration: a comparison of structural equation and dynamic causal models", NeuroImage, vol. 23, Supplement 1, 2004, Pages S264-S274 (Year: 2004).
Xiong, et al. "A critical review of structural equation modeling applications in construction research", Automation in Construction, vol. 49, Part A, Jan. 2015, pp. 59-70 (Year: 2015).
Zhao, et al., "A Novel Enhancement and Tracking Extraction Method of Bearing Fault Features for Rotating Machinery," 2020 IEEE 3rd International Conference on Electronic Information and Communication Technology (ICEICT), Shenzhen, China, 2020, pp. 89-93 (Year: 2020).

* cited by examiner

Model Metrics

| | |
|---|---|
| CLS_Model | bVibes_MLP_PS_O_2CLS |
| Concordance | 99.8% |
| Prob(Defect_Thresh) | 61.0% |
| F1_Score | 99.8% |
| SEG_Model | bVibes_CA_O_4SEG |
| nSegments | 4 |
| Stability | 72.0% |
| MDS_Scale | 1.1 |
| MDS_R2 | 1.0 |

Inference

| | |
|---|---|
| Case_ID | 56_New |
| Prob(Defect) | 96.5% |
| Predicted Class | Defect |
| Actual Class | Good |
| Nearest Seg | Seg#4 |
| z-Value[ModelFeatures] | -0.9 ● |
| z-Value[CaseAttrib] | 3.2 ◐ |
| Novelty | 1isRepresented ○ |
| Recommendation | Review |

DETECTION AND VISUALIZATION OF NOVEL DATA INSTANCES FOR SELF-HEALING AI/ML MODEL-BASED SOLUTION DEPLOYMENT

FIELD OF TECHNOLOGY

This patent document relates generally to machine learning analysis and more specifically to the identification and treatment of novel data in machine learning analysis.

BACKGROUND

Supervised machine learning analysis involves training a model using training data. The trained model may then be deployed to a production environment. For example, data characterizing the operation and occasional failure of machines may be used to train a model to identify machine failure. The trained model may then be deployed in a production environment such as a mechanical shop to predict machine failures before they occur.

Efficacies of the supervised learning paradigms of such predictive models are constrained by the correctness of the ground truth. That is, the predictive performance of a model is limited by the novelty of the production data with respect to the distribution of the training data in the feature space. Such limitations affect the evaluation of the models for deployment. Given the importance of predictive models across a range of industrial and non-industrial applications, improved techniques for training and deploying prediction models are desired.

OVERVIEW

Systems, apparatus, methods and computer program products described herein facilitate the detection and visualization of novel data in machine learning analysis. According to various embodiments, a designated feature data segment of a plurality of feature data segments may be determined by applying a feature segmentation model to a test data observation via a processor. The feature segmentation model may be pre-trained via a plurality of training data observations. The feature segmentation model may divide the plurality of training data observations into the plurality of feature data segments. A predicted target value may be determined by applying a prediction model to a test data observation via a processor. The prediction model may be pre-trained via a plurality of training data observations. One or more distance metrics representing a respective distance between the test data observation and the feature data segment along one or more dimensions may be determined. A first instruction may be transmitted to generate a user interface representing the one or more distance metrics. User input may be received via the generated user interface. The user input may include a second instruction to update the prediction model and the feature segmentation model. An updated prediction model and an updated feature segmentation model that both incorporate the test data observation and the training data observations may be determined.

In some implementations, the generated user interface may include a density plot that plots a designated distance metric in relation to a plurality of comparison distance metrics corresponding to respective ones of the training data observations. The generated user interface may include a multi-dimensional scaling plot that plots a designated distance metric in relation to a plurality of comparison distance metrics corresponding to respective ones of the training data observations.

In some embodiments, the test data observation may include a case attribute vector, which may include one or more metadata values characterizing the test data observation. The generated user interface may include a feature representation plot that illustrates a respective one or more statistics computed for each of a plurality of feature representation distance metrics, each of the statistics corresponding to a respective one of the metadata values.

In some embodiments, the test data observation may include a feature vector including a plurality of feature values corresponding with a respective plurality of features associated with the prediction model. Applying the feature segmentation model to the test data observation may involve applying the feature segmentation model to the feature vector. The generated user interface may include a feature representation plot that illustrates a respective one or more statistics computed for each of a plurality of feature representation distance metrics. Each of the statistics may correspond to a respective one of the feature values.

In some embodiments, the test data observation may be classified as belonging to a designated one of a plurality of novelty classes based at least in part on a feature novelty value determined based on a comparison of the feature vector to the feature data segment. The plurality of novelty classes may include a first class indicating that an observation is well-represented among the training data observations and a second class indicating that an observation is unrepresented among the training data observations.

In some implementations, the plurality of novelty classes may include a third class indicating that an observation is under-represented among the training data observations. The generated user interface may display the designated novelty class. The generated user interface may include a model updating recommendation determined based at least in part on a test data observation novelty value indicating a degree of novelty of the test data observation relative to the plurality of training data observations.

In some embodiments, an actual target value for the test data observation may be determined. The updated prediction model may be determined at least in part based on the actual target value. The generated user interface may include a feature novelty value determined at least in part based on the actual target value.

BRIEF DESCRIPTION OF THE DRAWINGS

The included drawings are for illustrative purposes and serve only to provide examples of possible structures and operations for the disclosed inventive systems, apparatus, methods and computer program products for the detection of novel data in machine learning analysis. These drawings in no way limit any changes in form and detail that may be made by one skilled in the art without departing from the spirit and scope of the disclosed implementations.

FIG. 9A illustrates a model metrics graphical user interface, generated in accordance with one or more embodiments.

FIG. 9B illustrates a model inference graphical user interface, generated in accordance with one or more embodiments.

DETAILED DESCRIPTION

Figure 1:
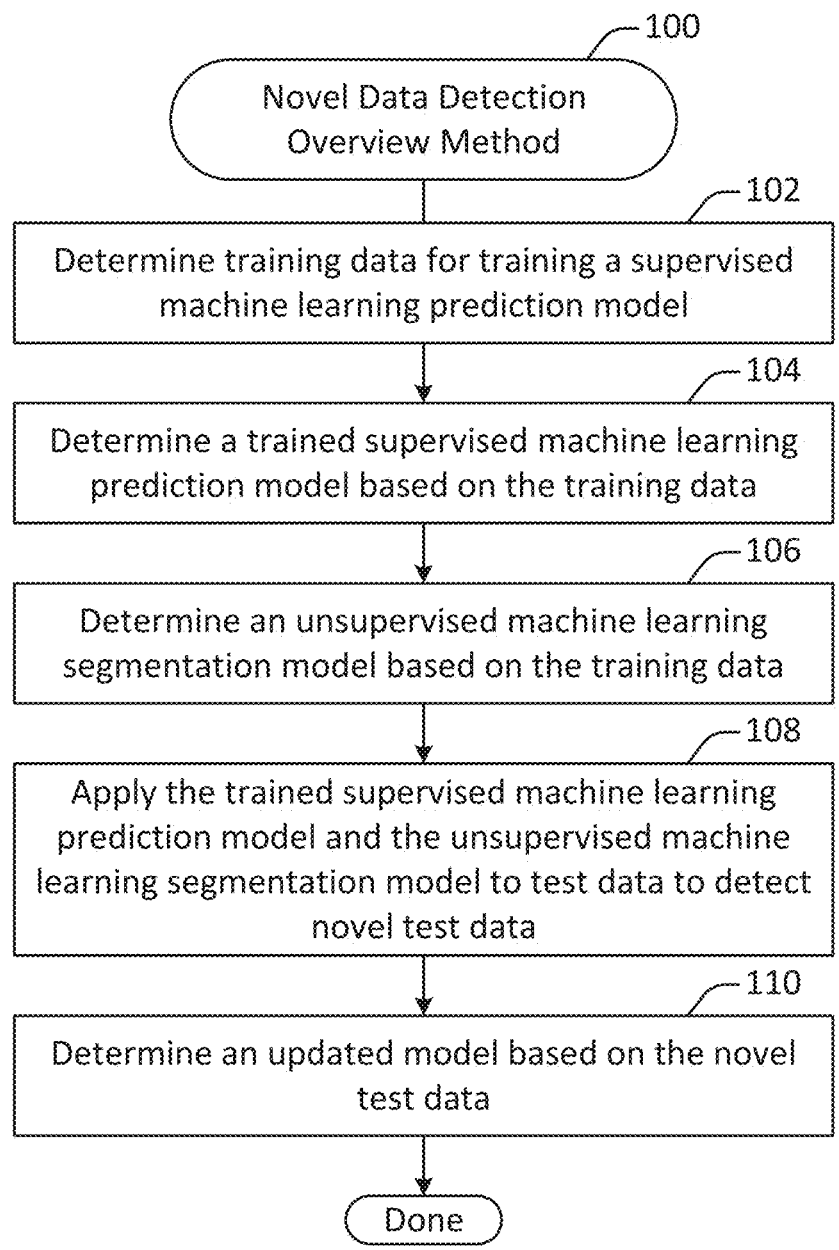
FIG. 1 illustrates an example of an overview method for novel data detection, performed in accordance with one or more embodiments.

Techniques and mechanisms described herein provide automated processes for integrating supervised and unsupervised classification results of a test data observation with training data observations in a feature space. Novelty of the test data observation relative to the feature space may be measured using a distance metric. For instance, a distance of a test case from the centers of stable segments of the training dataset in the feature space may be determined. Alternatively, or additionally, the distribution of the within-segment distances of the feature-vectors in the nearest segment may be determined. Such analysis may facilitate an automated, generalized inference rule-base for labeling the novelty of a test data observation. For instance, a test data observation may be labeled as well-represented, under-represented, or mis-represented in the training data. A rule-based recommendation engine may be used to facilitate incremental or batched self-healing with novel data.

Techniques and mechanisms described herein also provide automated processes for visualizing the novelty of data observations. A variety of plots may be presented that compare feature values for a test data observation with feature values for training data as represented by an unsupervised machine learning segmentation model. In addition, a prediction produced by a supervised machine learning prediction model may be compared with an actual outcome value for the test data observation. The combination of the information may be used to provide a prediction as to whether to update one or more models to reflect the new information included in the test data observation.

Prediction models are limited in efficacy by the data used in their construction. For example, consider a prediction model trained to predict the failure of bearings in mechanical machines. In such a context, failure indicators such as noise and smoke may occur only immediately before the failure event, while failure indicators such as changes in heat and pressure may occur further in advance. However, the earliest indicator of incipient failure may be vibration detected vibration sensors. Nevertheless, the use of vibration data to predict machine failure may be limited by the availability of vibration data associated with failure conditions.

Keeping with the example of using vibration data to predict bearing failure, such failures may be divided into various categories, such as failures in the inner race, outer race, and balls, with different failure modes being associated with different types of vibration patterns. Moreover, vibration patterns may vary based on machine type, machine context, ambient temperature, ambient pressure, ambient vibration, and/or any of a variety of other characteristics. Thus, when using conventional techniques, static training data may fail to encompass many of the large variety of conditions under which vibrations may indicate incipient failure.

Compounding the problem, limited sources of training data exist for many contexts in which a prediction model is desired. Generating training data empirically in a laboratory setting is often prohibitively expensive. Making matters worse, generating training data in a laboratory setting that comprehensively covers the range of possible failure conditions that may occur in real-world contexts such as idiosyncratic machine shops may be effectively impossible. For these and other reasons, conventional techniques fail to provide a way to generate a pre-trained prediction model for purposes such as using vibration to predict bearing failure in diverse real-world contexts.

The difficulty in using conventional techniques to generate a pre-trained model leads to a sort of "chicken and egg" problem. Data from real-world contexts may be collected from sensor units deployed to machines operating in real-world contexts. However, such sensors typically need to be deployed with a pre-trained prediction model, which as discussed above is often difficult to create using conventional techniques in the absence of real-world training data.

In contrast to conventional techniques, techniques and mechanisms described herein provide for the generation of supervised machine learning prediction models even in the absence of real-world training data. Such a trained supervised machine learning prediction model can then be deployed in real-world contexts such as machine shops. After deployment, the trained supervised machine learning prediction model can be used to predict failure events. At the same time, an unsupervised machine learning segmentation model may be used in conjunction with the supervised machine learning prediction model to classify newly observed test data based on its novelty relative to the training data. The novelty classification may then be used to formulate a response to the test data.

For the purpose of exposition, various techniques are described herein with reference to a particular example of a machine learning prediction problem in which machine vibration data is used to predict bearing failure. However, various embodiments of techniques and mechanisms described herein are broadly applicable to a range of contexts. For example, techniques and mechanisms described herein may be used to predict machine failure in a variety of contexts based on a variety of input data, such as data from various sensors of various types associated with mechanical machines or machine components. As another example, techniques and mechanisms described herein may be used to predict any type of outcome for which production data observed in deployment may at least occasionally differ considerably from patterns observable in data used to train the machine learning prediction model.

FIG. 1 illustrates an example of an overview method 100 for novel data detection, performed in accordance with one or more embodiments. According to various embodiments, the method 100 may be performed on any suitable computing device or devices.

Training data for training a supervised machine learning prediction model is determined at 102. In some embodiments, training data for training a supervised machine learning prediction model may be, at least in part, pre-determined or provided via conventional techniques. Alternatively, or additionally, training data for training a supervised machine learning prediction model may be, at least in part, generated using a simulation process. In such a process, one or more structural equations may be used to generate data that may then be used to train a model. Additional details regarding such a process are discussed with respect to the method 200 shown in FIG. 2.

A trained supervised machine learning prediction model is determined at 104 based on the training data. According to various embodiments, determining the trained supervised machine learning prediction model may involve operations such as dividing training data into modeling and validation components, implementing one or more model training and validation phases, and repeating such operations as desired. Additional details regarding the determination of a trained supervised machine learning prediction model are discussed with respect to the method 300 shown in FIG. 3.

An unsupervised machine learning segmentation model is determined at 106 based on the training data. According to various embodiments, determining the unsupervised machine learning segmentation model may involve operations such as dividing the training data into segments, determining definitions for the segments for applying to test data, and/or determining statistical profiles for the segments for use in statistical analysis of test data. Additional details regarding the determination of an unsupervised machine learning segmentation model are discussed with respect to the method 400 shown in FIG. 4.

According to various embodiments, training data observations may include feature vectors and/or case attributes. Feature vectors may include values about a particular observation that correspond to particular features. Case attributes may include metadata about an observation, such as characteristics of physical conditions that generated a data associated with a particular feature vector. For instance, in the case of bearings, case attributes may include characteristics such as bearing speed, bearing load, bearing size, ambient temperature, and/or other types of metadata. Case attributes and feature vectors may be treated separately in some configurations. Alternatively, or additionally, some or all of the case attribute values may be included in the corresponding feature vectors.

In some embodiments, a single segmentation model may be constructed, which may for instance correspond to the feature vectors. Alternatively, in some configurations more than one segmentation model may be constructed. For instance, different segmentation models may be constructed for feature vectors and case attributes.

The trained supervised machine learning prediction model and the unsupervised machine learning segmentation model are applied to test data at 108 to detect novel test data. When test data is consistent with data observed in the training phase, the prediction produced by the trained supervised machine learning prediction model may be employed. When instead test data is inconsistent with data observed in the training phase, the test data may be used to update the trained supervised machine learning prediction model.

An updated model is determined at 110 based on the novel test data. According to various embodiments, the test data response may involve operations such as presenting a visual representation of a novel test data item, receiving user input based on the visual representation, and updating one or both of the trained unsupervised machine learning segmentation model and the supervised machine learning prediction model.

In some embodiments, novelty detection for a test data observation may involve the application of more than one unsupervised machine learning segmentation models. For example, one model may be employed to evaluate novelty for a feature vector, while another model may be employed to evaluate novelty for a vector of case attributes.

Figure 2:
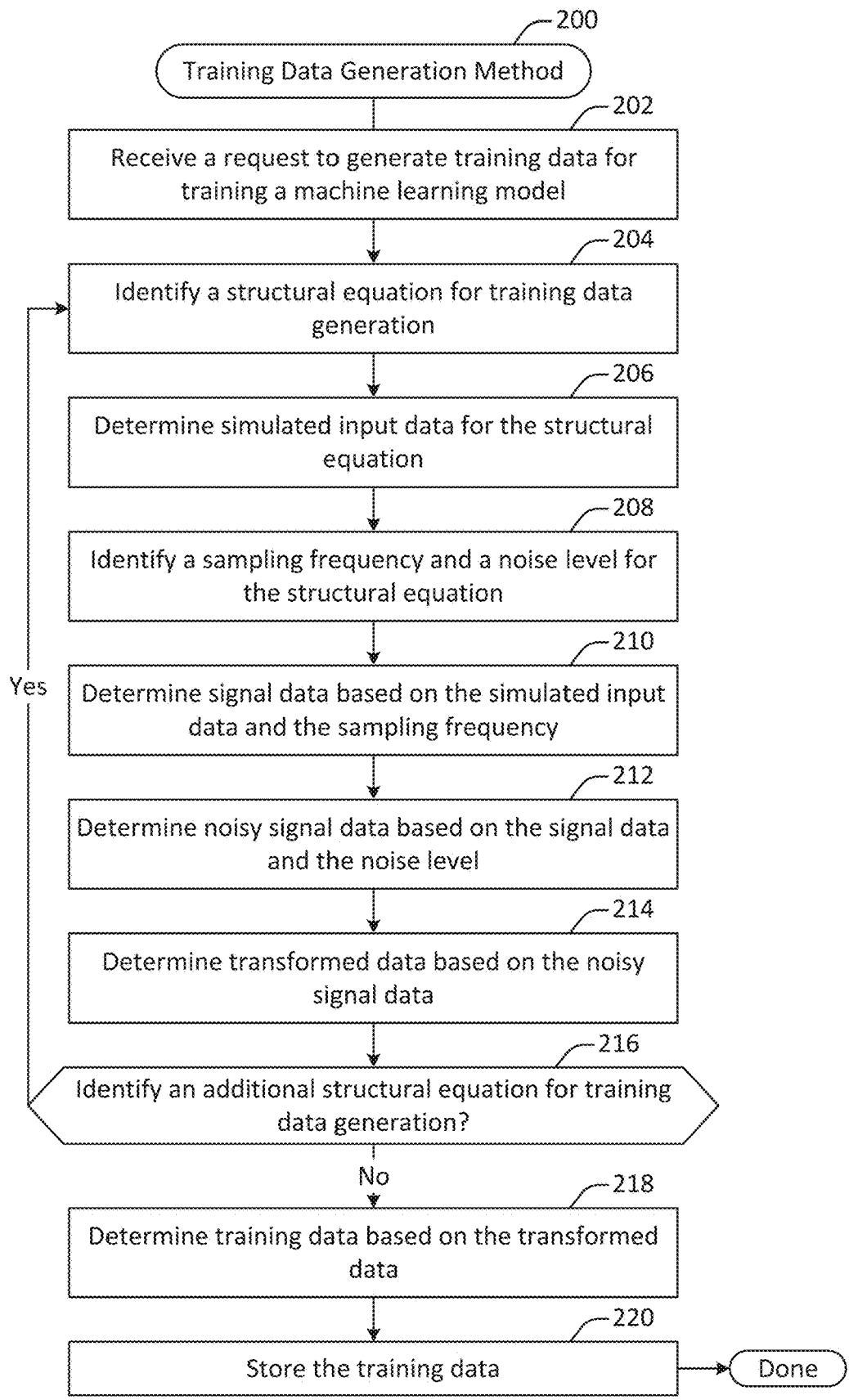
FIG. 2 illustrates an example of a method for training data generation, performed in accordance with one or more embodiments.

FIG. 2 illustrates an example of a method 200 for training data generation, performed in accordance with one or more embodiments. According to various embodiments, the method 200 may be performed on any suitable computing device, such as the system 600 discussed with respect to FIG. 6.

A request to generate training data for training a machine learning model is received at 202. In some embodiments, the request may be generated based on user input. For instance, a user may indicate a request to generate training data for a machine learning model. Alternatively, or additionally, the request may be generated automatically, for instance when a new structural equation is identified.

A structural equation for training data generation is identified at 204. According to various embodiments, a structural equation may be identified in any of various ways. For example, a user may manually specify a structural equation for generating data related to machine operation. As another example, such equations may be provided in a configuration file, along with supporting metadata information.

In particular embodiments, a structural equation may be used to model various types of operating conditions associated with a system. For example, one structural equation may model vibration data generated during normal operation of a machine, while another structural equation may model vibration data during a failure condition in which a bearing is failing due to a defect in an inner race. Each structural equation may include one or more variables, as well as metadata labeling the structural equation as corresponding to a particular mode of operation. The structural equation may be used to model, for example, vibration observable over time when a machine is operating in a particular failure condition.

In some embodiments, a structural equation may be generated based on empirical analysis, for instance in a laboratory environment. First, a machine may be operated in a stable state, while observing sensor data such as vibration data. Then, a defect may be introduced, such as a defect in a bearing ball or bearing race. The sensor data may continue to be observed as the machine or machine component operates and potentially fails as a consequence of the defect.

Simulated input data for the structural equation is determined at 206. According to various embodiments, the simulated input data may involve any data necessary for modeling the feature variables of interest in the structural equation. For example, the simulated input data may involve an amplitude value, which may vary over a particular range. As another example, a structural equation may include a time variable, as well as one or more other variables that vary as a function of time. In such a situation, the simulated input data may include a sequence of time values. As still another example, a structural equation may include a heat variable, as well as one or more other variables that vary as a function of heat. In such a situation, the simulated input data may include a sequence of heat values, for instance drawn from a range of heat values representative of real-world conditions. As yet another example, a structural equation may include multiple variables, in which case the simulated input data may include sequences of values generated in combination.

According to various embodiments, simulated input data may be generated in various ways. For example, simulated input data may be generated based at least in part on a sequence, such as a sequence of time. As another example, simulated input data may be generated based at least in part on a combinatorial process, for instance by combining different discrete values. As yet another example, simulated input data may be generated based at least in part on a statistical process, for instance by selecting random draws from a distribution.

A sampling frequency and a noise level for the structural equation are identified at 208. According to various embodiments, the sampling frequency and/or the noise level may be determined based on user input. Alternatively, or additionally, the sampling frequency and/or the noise level may be determined based at least in part on analysis of the structural equation.

In some embodiments, the sampling frequency and/or the noise level may be specified as constants. For instance, the sampling frequency may be specified in hertz, while the noise level may be specified as a standard deviation. Alternatively, or additionally, one or more of the sampling frequency or the noise level may be specified as a function that varies based on some input value. For instance, a structural equation may be sampled at a higher rate for some value ranges than for other value ranges.

Signal data is determined at 210 based on the simulated input data and the sampling frequency. In some embodiments, the signal data may be determined by applying the structural equation to the simulated input data and determining signal data at the specified sampling frequency.

According to various embodiments, the signal data may be represented as a set of observations. Each observation may include a feature vector that each includes values corresponding with one or more features. The features may be specified as, for instance, variables in the structural equation. In addition, the feature vectors may be labeled based on characteristics and/or metadata associated with the structural equation. For example, one structural equation may be known to model a particular failure condition, while another structural equation may be known to model a steady state of operation. As another example, one feature vector for a structural equation may be known to correspond to a particular failure condition, while another feature vector for a structural equation may be known to correspond to a steady state of operation. These known states may provide the labels for constructing the labeled feature vectors.

Noisy signal data is determined at 212 based on the signal data and the noise level. In some embodiments, determining the noisy signal data may involve applying a statistical simulation process in which new data is generated by combining randomly or pseudo-randomly generated noise with the signal data. For example, consider a signal data point indicating a particular vibration level value at a particular point in time. One or more noisy signal data points may be generated by selecting a random draw from a normal distribution having a mean at the signal data point and a standard deviation determined based on the noise level. As another example, other types of distributions may be used instead of a normal distribution.

Transformed data is determined at 214 based on the noisy signal data. In some embodiments, determining transformed data may involve applying one or more transformation functions to the noisy signal data. Depending on the context, any of a variety of transformation functions may be used.

In particular embodiments, a Fourier transformation may be applied to convert the noisy signal data to the frequency domain. The resulting transformed data may be on the power spectrum, in which signal power is determined as a function of frequency.

According to various embodiments, transformation may help to deal with cyclicity in the data. For instance, vibration data for a machine component may exhibit seasonal variation patterns that vary based on, for example, the particular stage of a mechanical process. Alternatively, or additionally, transformation may help to address issues related to analog-to-digital conversion, since sensors may differ in their sampling frequency.

A determination is made at 216 as to whether to identify an additional structural equation for generating training data. In some embodiments, additional structural equations may be identified and analyzed until a suitable terminating condition is met, such as analysis of all available structural equations having been completed.

When it is determined not to identify an additional structural equation for generating training data, at 218 training data is determined based on the transformed data. In some embodiments, the training data may be determined by combining the transformed data generated for different structural equations into a single data set.

The training data is stored at 220. In some embodiments, the training data may be stored in such a way that it may be used to train a supervised machine learning prediction model as discussed with respect to the method 300 shown in FIG. 3 and to train an unsupervised machine learning segmentation model as discussed with respect to the method 400 shown in FIG. 4. For example, the training data may be stored as a set of labeled feature vectors suitable for use in supervised machine learning analysis.

In particular embodiments, training data may include feature vectors and/or case attribute vectors. Case attribute vectors may include characteristics such as device specifications, physical attributes, operating conditions such as temperature or speed, or other such metadata values characterizing a training data observation. In some configurations, some or all of the case attribute data may be stored within the feature vector. Alternatively, or additionally, case attribute data may be stored separately, for instance in a case attribute vector.

According to various embodiments, one or more operations shown in FIG. 2 may be performed in an order different from that shown. For instance, one or more of operations 204-216 may be performed in parallel, for example to analyze more than one structural equation at the same time.

According to various embodiments, one or more operations shown in FIG. 2 may be omitted. For instance, in some contexts noisy signal data may be used directly without transforming it as discussed with respect to operation 214.

Figure 3:
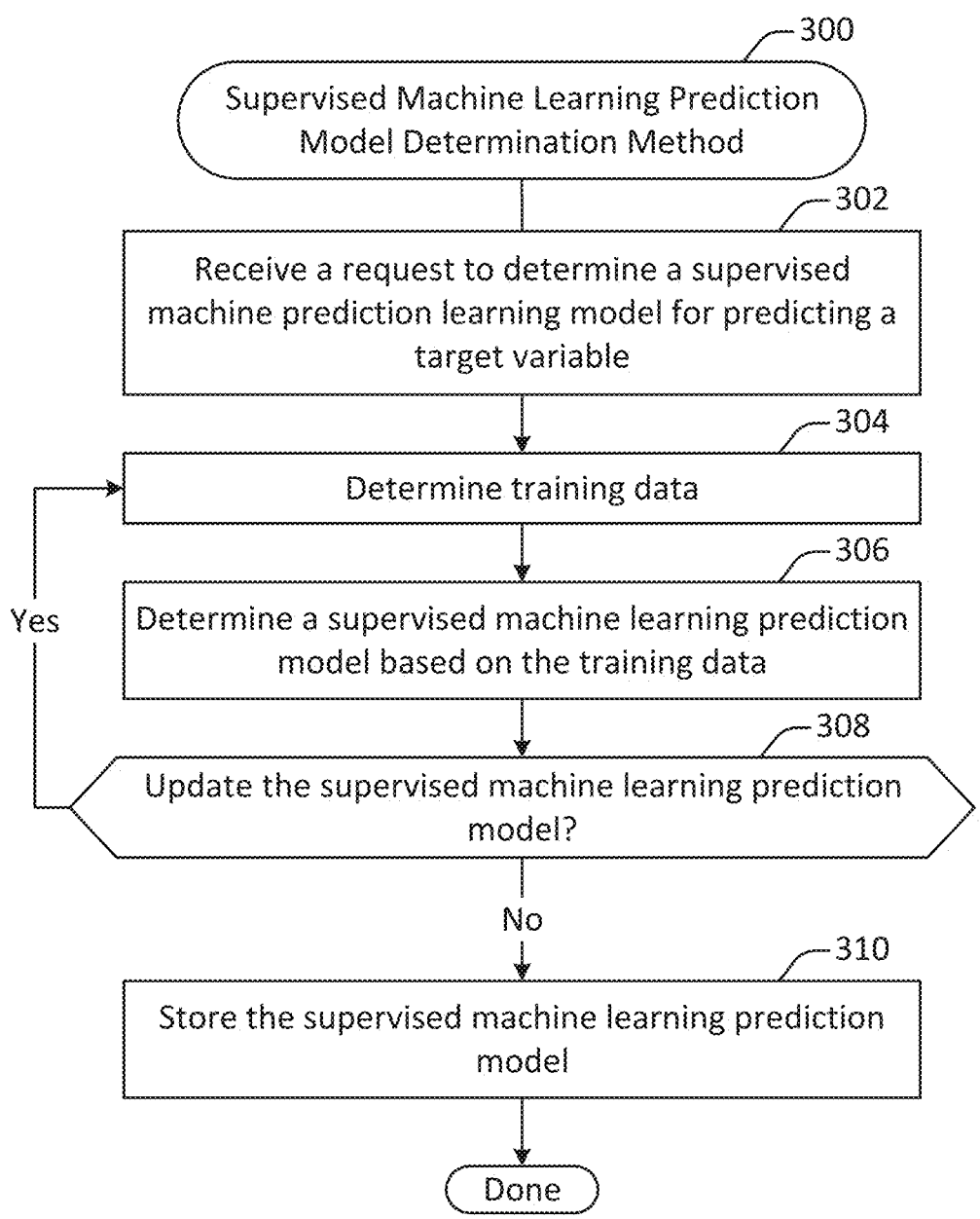
FIG. 3 illustrates an example of a method for determining a supervised machine learning prediction model, performed in accordance with one or more embodiments.

FIG. 3 illustrates an example of a method 300 for determining a supervised machine learning prediction model, performed in accordance with one or more embodiments. According to various embodiments, the method 300 may be performed on any suitable computing device, such as the system 600 discussed with respect to FIG. 6.

A request to determine a supervised machine learning prediction model for predicting a target variable is received at 302. In some embodiments, the request to determine the supervised machine learning prediction model may be generated based on user input. For instance, the supervised machine learning prediction model may be generated in order to create a model for deployment in a production process. Alternatively, the request to determine the supervised machine learning prediction model may be generated automatically. For instance, in a production context, the supervised machine learning prediction model may be updated based on novel data detected after the supervised machine learning prediction model has been deployed. Additional details regarding the detection and treatment of novel data are discussed with respect to the method 500 shown in FIG. 5.

Training data is determined at 304. In some embodiments, the training data may be determined as discussed with respect to the method 200 shown in FIG. 2. Alternatively, or additionally, some or all of the training data may be predetermined in some other manner, for instance based on data empirically observed in a real-world or laboratory environment. As yet another possibility, some or all of the training data may be novel data determined as discussed with respect to the method 500 shown in FIG. 5.

A supervised machine learning model is determined based on the training data at 306. According to various embodiments, any of a variety of supervised machine learning models may be employed depending on the context. Such models may include, but are not limited to: tree-based models (e.g., random forests), neural network models (e.g., deep learning models), regression models (e.g., logit models), and ensemble models. The particular operations employed for determining the trained supervised machine learning model may vary based on the type of model employed.

A determination is made at 308 as to whether to update the supervised machine learning model. According to various embodiments, the determination may involve validating the supervised machine learning prediction model using validation data. For instance, the system may determine whether the performance of the supervised machine learning prediction model in predicting the validation data exceeds a designated threshold.

The supervised machine learning model is stored at 310. In some embodiments, storing the supervised machine learning model may involve deploying the supervised machine learning model in a production environment. For example, the supervised machine learning model may be deployed in conjunction with one or more physical sensors in a hardware context. However, a variety of storage and deployment contexts are possible.

Figure 4:
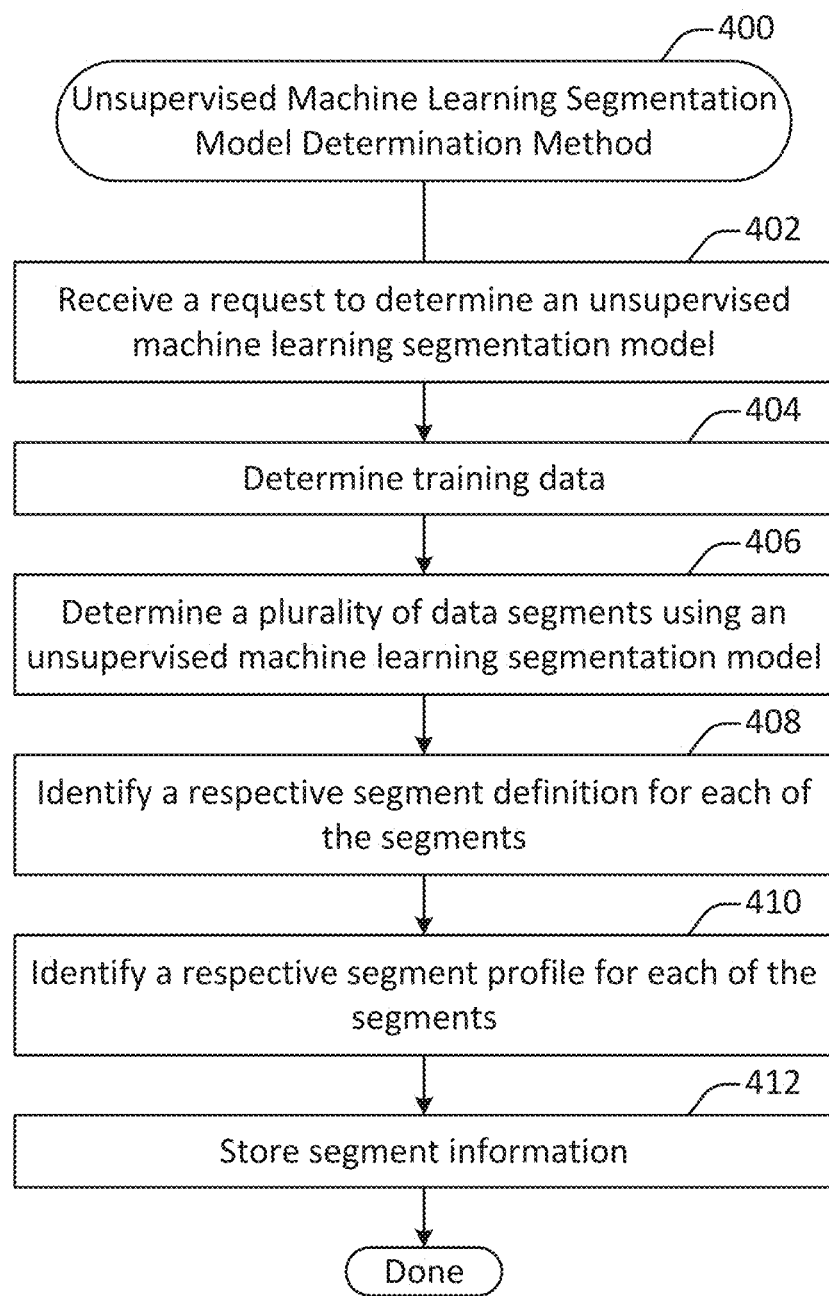
FIG. 4 illustrates an example of a method for determining an unsupervised machine learning segmentation model, performed in accordance with one or more embodiments.

FIG. 4 illustrates an example of a method 400 for determining an unsupervised machine learning segmentation model, performed in accordance with one or more embodiments. According to various embodiments, the method 400 may be performed on any suitable computing device, such as the system 600 discussed with respect to FIG. 6.

A request to determine an unsupervised machine learning segmentation model is received at 402. According to various embodiments, the request may be generated as discussed with respect to the operation 106 shown in FIG. 1.

Training data is determined at 404. In some embodiments, the training data may be determined as discussed with respect to the method 200 shown in FIG. 2. Alternatively, or additionally, some or all of the training data may be predetermined in some other manner, for instance based on data empirically observed in a real-world or laboratory environment. As yet another possibility, some or all of the training data may be novel data used to update the model determined as discussed with respect to the method 500 shown in FIG. 5. The training data determined at 404 may be substantially similar to or identical with the training data determined at 304.

A plurality of data segments are determined at 406 using an unsupervised machine learning segmentation model. According to various embodiments, any of a variety of segmentation models may be used. Such models may include, but are not limited to: k-means clustering, meanshift clustering, density-based spatial clustering of applications with noise (DBSCAN), expectation-maximization (EM) clustering using Gaussian mixture models (GMM), and combinations models. The particular operations performed to determine the plurality of data segments may depend in part on the type of segmentation model employed.

In some embodiments, the plurality of data segments may be determined by maximizing the distance between data segments in different feature vectors while minimizing the distance between feature vectors within the same data segment. In some configurations, the data segments may be constructed so that they do not overlap. That is, a feature vector may belong to only one data segment.

A respective segment definition is determined for each of the segments at 408. According to various embodiments, the segment definition for a segment may include one or more criteria used to identify a feature vector as belonging to the segment. For instance, the segment definition may define a region in a feature spaced. A region within a feature space may be defined based on characteristics such as one or more ranges of feature values, one or more distances from a central point or points, one or more functions over feature values, one or more boundary points, or any other suitable mechanism for delineation. The segment definition may also include other related information, such as a number of feature vectors in the training data that fall within the segment definition.

A respective segment profile is determined for each of the segments at 410. According to various embodiments, the segment profile for a segment may be determined by performing a statistical analysis of the feature vectors classified as belonging to the segment under the segment definition determined at 408. Depending on the context, any of various types of statistical analysis may be performed. Some examples of such analysis include statistics such as the mean, median, maximum, minimum, standard deviation, variance, skewness, kurtosis, or one or more percentiles of one or more features represented in the feature vectors, and/or a number of feature vectors in the training data that fall within the segment definition. Other examples of such analysis include identification of characteristics such as a distributional form (e.g., a normal distribution) for one or more features represented in the feature vectors.

Segment information is stored at 412. According to various embodiments, the segment information that is stored may include the segment definitions identified at 408 and the segment profiles identified at 410. The segment information may be stored in such a way that it may be deployed with a prediction model to for application to test data, as discussed in additional detail with respect to the method 500 shown in FIG. 5.

Figure 5:
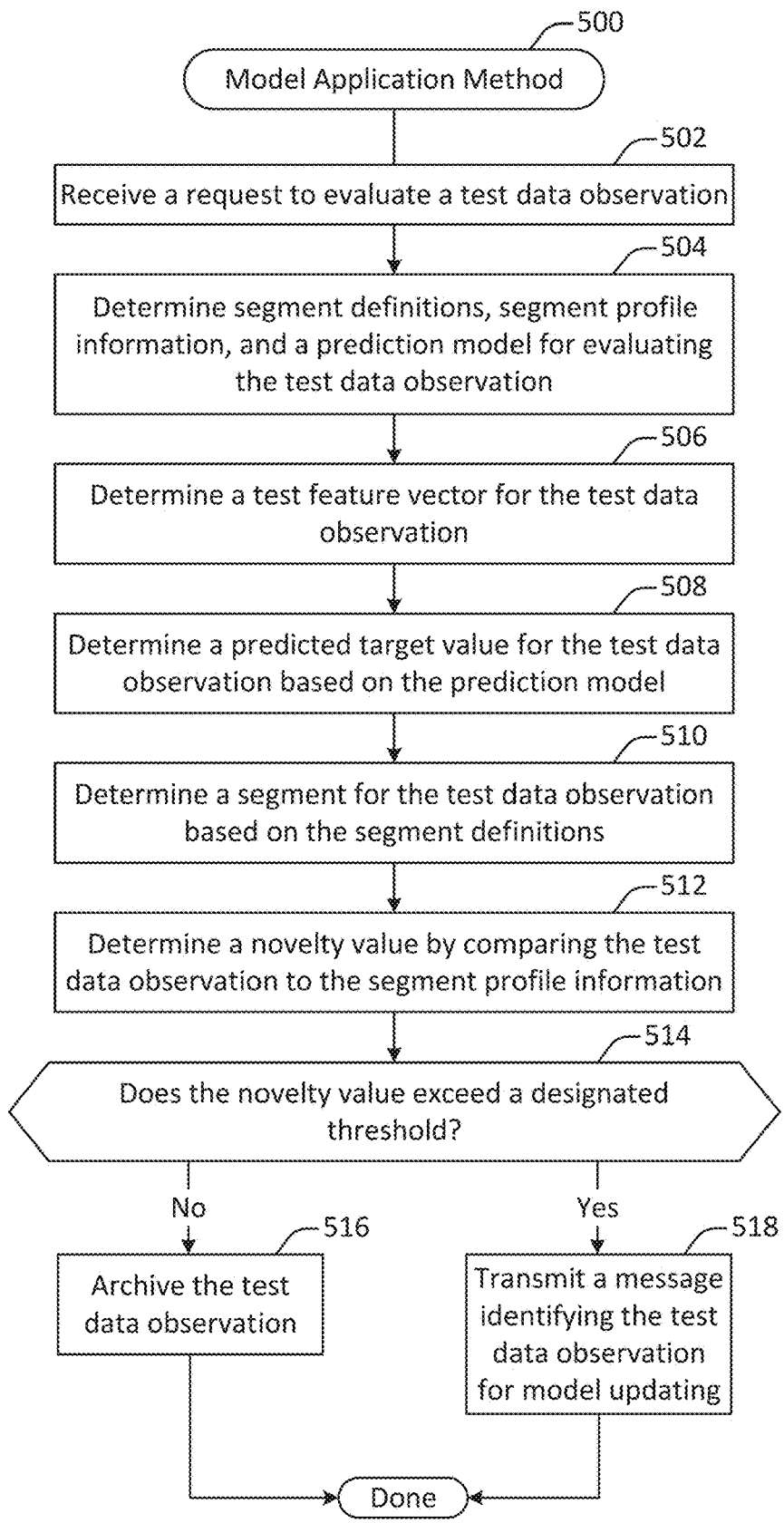
FIG. 5 illustrates an example of a method for applying supervised and unsupervised models, performed in accordance with one or more embodiments.

FIG. 5 illustrates an example of a method 500 for applying supervised and unsupervised models, performed in accordance with one or more embodiments. According to various embodiments, the method 500 may be performed on any suitable computing device, such as the system 600 discussed with respect to FIG. 6.

A request to evaluate a test data observation is received at 502. In some implementations, the request may be received at a computing device analyzing sensor data for a deployed prediction model. For instance, the request may be received at a computing device configured to monitor sensor data for one or more machines deployed in a machine shop.

According to various embodiments, the method 500 is described for the purpose of exposition as being used to evaluate a single test data observation. However, the techniques described with respect to the method 500 shown in FIG. 5 may be applied to any suitable number of test data observations, analyzed in sequence or in parallel.

Segment definitions, segment profile information, and a prediction model for evaluating the test data are determined at 504. In some implementations, the segment definitions, segment profile information, and a prediction model may be determined as discussed with respect to the methods 300 and 400 shown in FIG. 3 and FIG. 4.

A test data observation is determined for the test data at 506. In some embodiments, the test data observation may be determined by applying to the test data the same one or more transformations discussed with respect to the operation 214 shown in FIG. 2.

At 508, a predicted target value is determined for the test data observation based on the prediction model. According to various embodiments, the predicted target value may be determined by applying the pre-trained prediction model to the test data observation to produce the predicted target value.

A segment for the test data observation is determined at 510 based on the segment definitions. In some embodiments, as discussed with respect to the method 400 shown in FIG. 4, the training data may be divided into multiple segments, each of which is associated with a respective segment definition. A segment definition may include, for instance, a set of boundary conditions that identify an area of the feature space. The segment for the test data observation may be determined by comparing it to the boundary conditions for the different segments and then categorizing it as belonging to a designated one of the segments.

According to various embodiments, in the event that the test data observation does not meet the definition for any of the segments, then the test data observation may be assigned to the segment to which it is most proximate. Distance from the test data observation to the segment may be defined in any of various ways. For example, distance may be measured to the center or to the boundary of the segment. As another example, a statistical metric may be used, such as the number of standard deviations of the distance metric from the center of the segment to the test data observation. The standard deviation may be defined, for instance, based on an application of the distance metric to the training data observations included in the segment.

A novelty value is determined at 512 by comparing the test data observation to the segment profile information. According to various embodiments, the novelty value may be determined by calculating a normalized distance from the test data observation to the center of the segment profile. For example, a distance of test data observation to the center of the segment profile may be divided by the standard deviation of such distances for training data observations in the segment to produce the novelty value.

A determination is made at 514 as to whether the novelty value exceeds a designated threshold. According to various embodiments, the designated threshold may be strategically determined based on various considerations. For instance, a higher threshold may result in less model adjustment, which may yield less precise models while saving computational resources. On the other hand, a lower threshold may result in more model adjustment, which may yield more precise models at the expense of increased computational resources.

If it is determined that the novelty value does not exceed the designated threshold, then at 516 the test data observation is archived. According to various embodiments, archiving the test data observation may involve storing the test data observation for later use. For example, the test data observation may be used in subsequent model training. As another example, the test data observation may be manually reviewed by an administrator, who may take an action such as discarding the test data observation, manually labeling the test data observation, and/or using the test data observation for model training.

According to various embodiments, more than one novelty value threshold may be used to evaluate the test data. For example, two different novelty value thresholds may be used to categorize a designated test data observation as being either well-represented, under-represented, or misrepresented in the training data used to train the model.

If it is instead determined that the novelty value does not exceed the designated threshold, then at 518 a message identifying the test data observation for model updating is transmitted. According to various embodiments, the message may be transmitted via a communication interface. The message may cause one or more of the operations shown in FIG. 3 and/or FIG. 4 to be performed again, with previously-employed training data supplemented by observed test data. In some configurations, previously-employed training data may eventually be replaced with observed test data, for instance over the long term if sufficient test data is available.

In some embodiments, the message may be transmitted to a user via a user interface. The user may then view information related to the novelty determination. In some configurations, the user interface may be operable to receive user input. The user input may indicate, for instance, whether the model should be updated.

According to various embodiments, the method 500 is described as creating and evaluating a single novelty value for a single test data observation, for the purpose of exposition. However, the method 500 may be used to test more than one test observation. Alternatively, or additionally, the method 500 may be used to create and evaluate more than one novelty value for each test observation. For example, as described herein, the method 500 may be used to separately or jointly evaluate the novelty of a feature vector and a case attribute vector for a test observation. In such a configuration, a test data observation may be treated as novel if either the novelty of the case attribute vector or the feature vector exceeds a respective novelty threshold.

Figure 6:
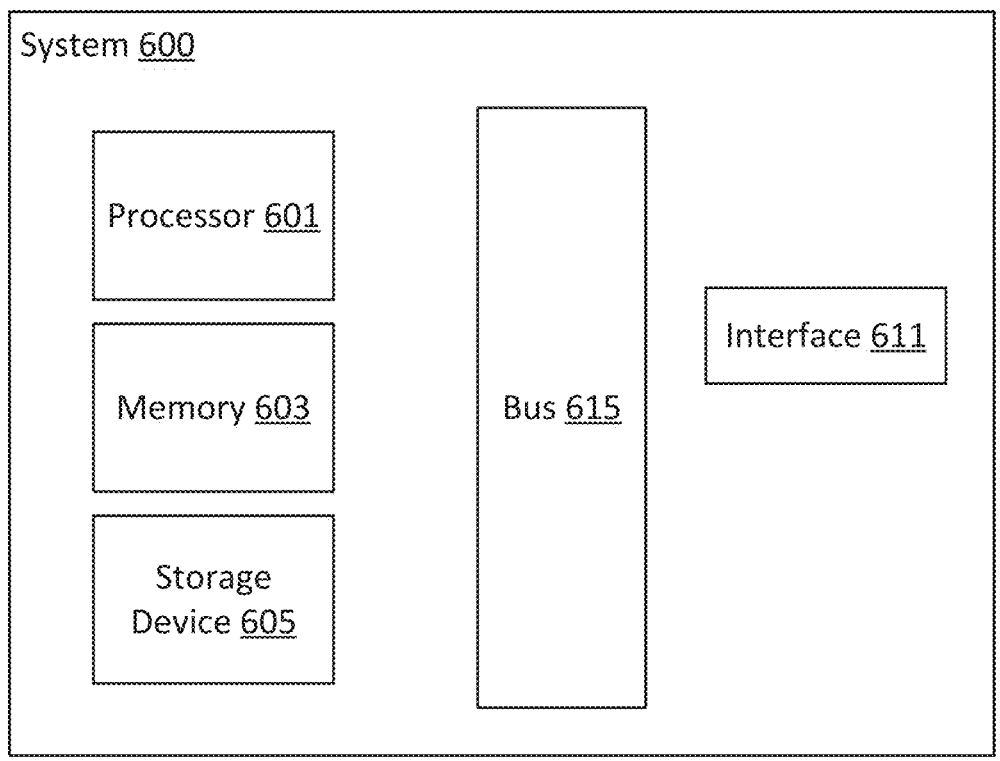
FIG. 6 illustrates one example of a computing device, configured in accordance with one or more embodiments.

FIG. 6 illustrates one example of a computing device. According to various embodiments, a system 600 suitable for implementing embodiments described herein includes a processor 601, a memory module 603, a storage device 605, an interface 611, and a bus 615 (e.g., a PCI bus or other interconnection fabric.) System 600 may operate as variety of devices such as a computing device in a model training context, a computing device in a deployed model test context, or any other device or service described herein. Although a particular configuration is described, a variety of alternative configurations are possible. The processor 601 may perform operations such as implementing a prediction model, performing drift detection, and/or updating a prediction model. Instructions for performing such operations may be embodied in the memory 603, on one or more non-transitory computer readable media, or on some other storage device. Various specially configured devices can also be used in place of or in addition to the processor 601. The interface 611 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user. In some embodiments, the computing device 600 may be implemented in a cloud computing environment.

Figure 7:
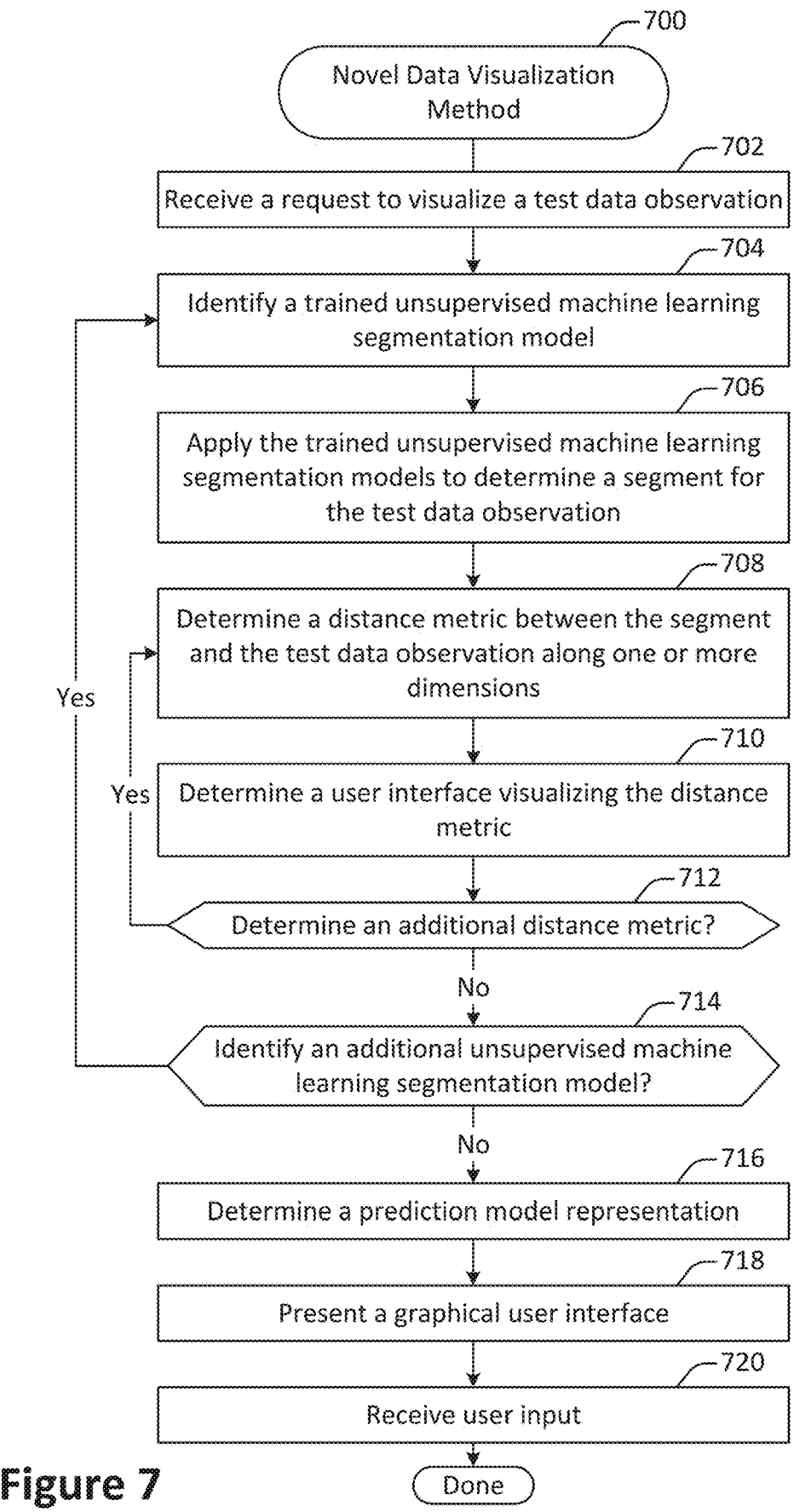
FIG. 7 illustrates a novelty representation method, performed in accordance with one or more embodiments.

FIG. 7 illustrates a novelty representation method 700, performed in accordance with one or more embodiments. According to various embodiments, the method 700 may be used to evaluate, visualization, and receive user input regarding one or more test data observation. Examples of the type of user interfaces that may be used to visualize test data observations are shown in FIGS. 8 through 14.

A request to visualize a test data observation is received at 702. In some embodiments, the request may be generated automatically. For instance, the request may be generated automatically when a novelty value exceeds a designated threshold as determined at 514 in FIG. 4. Alternatively, the request may be generated based on user input. For instance, a user may provide user input requesting to visualize one or more test data observations.

In some embodiments, although FIG. 7 is described for clarity as relating to a single test data observation, more than one test data observations may be analyzed in sequence, in parallel, and/or in aggregate. For instance, a group of related test data observations captured from the same machine or group of machines may be analyzed together.

Figure 8:
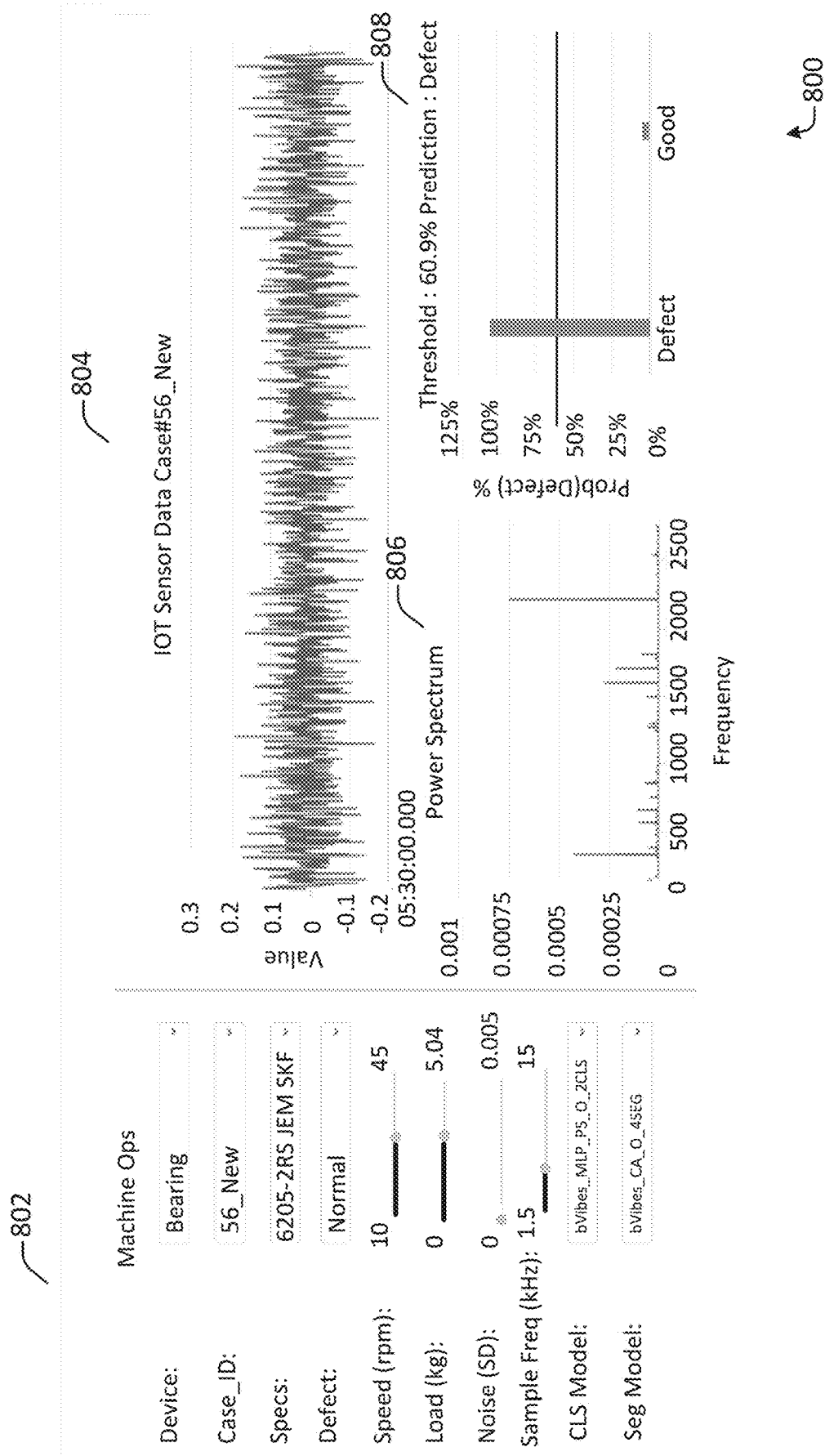
FIG. 8 illustrates a novelty overview graphical user interface, generated in accordance with one or more embodiments.

FIG. 7 is described with reference to FIGS. 8-14, which illustrate graphical user interfaces generated in accordance with one or more embodiments. For example, FIG. 8 illustrates a novelty overview graphical user interface 800, generated in accordance with one or more embodiments. According to various embodiments, the novelty overview graphical user interface 800 includes an observation metadata interface 802, a sensor data graph 804, a power spectrum graph 806, and a predicted classification graph 808. The novelty overview graphical user interface 800, or a different graphical user interface configured in accordance with techniques and mechanisms described herein, may be generated as part of the implementation of the method 700 shown in FIG. 7.

According to various embodiments, the observation metadata interface 802 includes a representation of one or more metadata characteristics of a particular test data observation. Data values represented in the observation metadata interface 802 may include values provided to machine learning models described herein, such as an unsupervised machine learning segmentation model and/or a supervised machine learning prediction model. For instance, a prediction as to whether a bearing is in danger of failing may depend on characteristics of the bearing. For example, a particular noise level may be indicative of failure for a particular model of bearing operating at a particular load and speed, while the same noise level may not be indicative of failure for a different type of bearing operating at the same load and speed.

According to various embodiments, the metadata characteristics may be observed values that characterize the subject of the test data unit. For instance, the graphical user interface 800 illustrates data related to a bearing. Accordingly, the observation metadata interface 802 illustrates characteristics such as bearing speed, bearing load, bearing noise, data sampling frequency, bearing specifications, a bearing identifier, and the like.

For the purpose of illustration, the novelty overview graphical user interface 800 illustrates data related to a bearing. However, techniques and mechanisms described herein are generally applicable to machine learning models in a variety of contexts. For instance, techniques and mechanisms described herein may be applied to engines, vehicles, machines operating in a machine shop, or any other suitable context.

The novelty overview graphical user interface 800 includes a sensor data plot 804 that illustrates sensor data for the test data observation observed over time. According to various embodiments, the sensor data may correspond to any suitable information, such as vibration, that is detectable for the test data observation.

The novelty overview graphical user interface 800 includes a power spectrum plot 806 that represents the sensor data transformed to the power spectrum. For instance, the power spectrum plot 806 may be determined by applying a fast Fourier transform (FFT) to the sensor data.

In some embodiments, the predicted classification graph 808 illustrates a result of a prediction by the supervised machine learning model as to the class of the test data observation. In the protected classification graph 808, a prediction probability is shown for each of two classes: defect and good. In addition, a predetermined prediction threshold of 60.9% is represented as well. Because the predicted probability for defect exceeds the predetermined prediction threshold of 60.9%, the bearing is predicted to fail.

For the purpose of illustration, embodiments of techniques and mechanisms described herein are described with respect to a supervised machine learning model trained to detect whether a bearing is defective. However, in other contexts a supervised machine learning model may be trained to make other predictions, such as predicting a continuous value or a discrete class having multiple values.

Returning to FIG. 7, a trained unsupervised machine learning segmentation model is identified at 704 and then applied to the test data observation at 706. According to various embodiments, as discussed herein, one or more unsupervised machine learning segmentation models may be trained for a particular empirical context. For example, one model may be trained for case attributes, while another model may be trained using features. In this way, different models may be used to capture different aspects of a test data observation, such as one model being used to capture observed values while another model being used to represent the context in which the values are observed.

A distance metric between the segment and the test data observation is determined along one or more dimensions at 708. A user interface visualizing the distance metric is determined at 710.

According to various embodiments, any of a variety of distance metrics may be used. For instance, the distance metric may be a Euclidean distance metric, a Mahalanobis distance metric, or any other suitable metric.

For example, the metric may be computed between any of various points. For example, the distance metric may be computed between the test data observation and the mean, median, or other central tendency measure of the segment. As another example, the distance metric may be computed between the test data observation and the nearest boundary of the segment. As yet another example, the distance metric may be computed between the test data observation and the nearest training data observation included in the segment.

In some embodiments, the distance metric may be determined for the observation as a whole. For instance, the distance metric may be computed as the distance from the test data observation to the segment in a multi-dimensional space.

Figure 10:
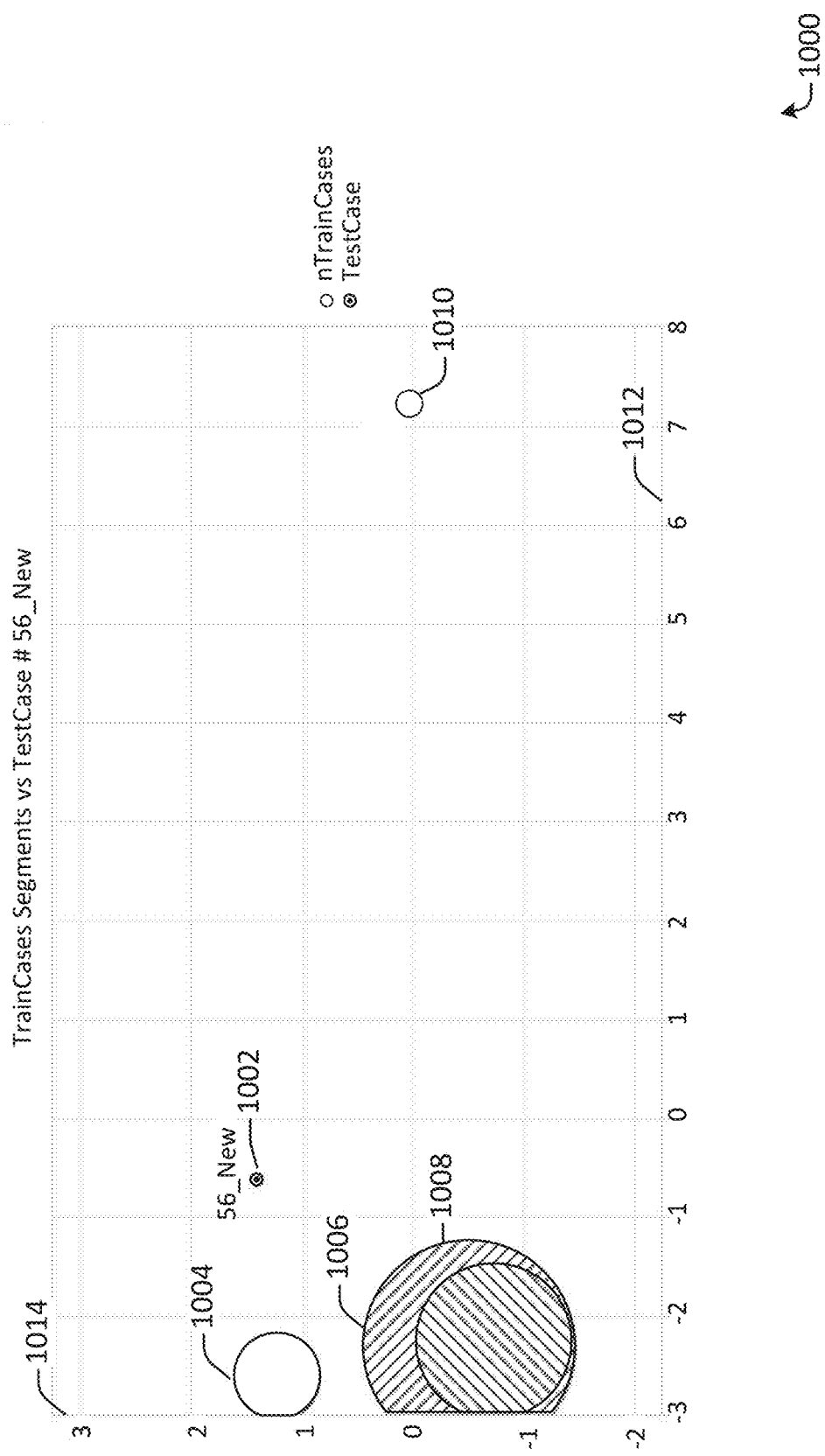
FIG. 10 illustrates a multi-dimensional scaling segmentation plot graphical user interface, generated in accordance with one or more embodiments.

FIG. 10 illustrates a multi-dimensional scaling segmentation plot graphical user interface 1000, generated in accordance with one or more embodiments. The multi-dimensional scaling segmentation plot graphical user interface 1000 may be used to represent in two dimensions the relationship between one or more test data observations and segments in an unsupervised machine learning segmentation model.

In FIG. 10, the axes 1012 and 1014 represent dimensions determined by applying a multi-dimensional scaling model to the feature space represented in the unsupervised machine learning segmentation model. The segment regions 1004, 1006, 1008, and 1010 represent regions of the feature space in which observations corresponding to the four different segments are positioned.

In FIG. 10, test data observation is represented at 1002. FIG. 10 shows that the test data observation is relatively closer to segments 2, 3, and 4 and relatively further from segment 1. The size of each segment region may represent, for instance, the number of observations included in each segment. Thus, the fact that the test data observation 1002 is not located within the region surrounding any particular segment does not imply that the test data observation 1002 is misrepresented in the training data or would not be classified as belonging to one of the segments when analyzed via the unsupervised machine learning segmentation model.

Figure 13:
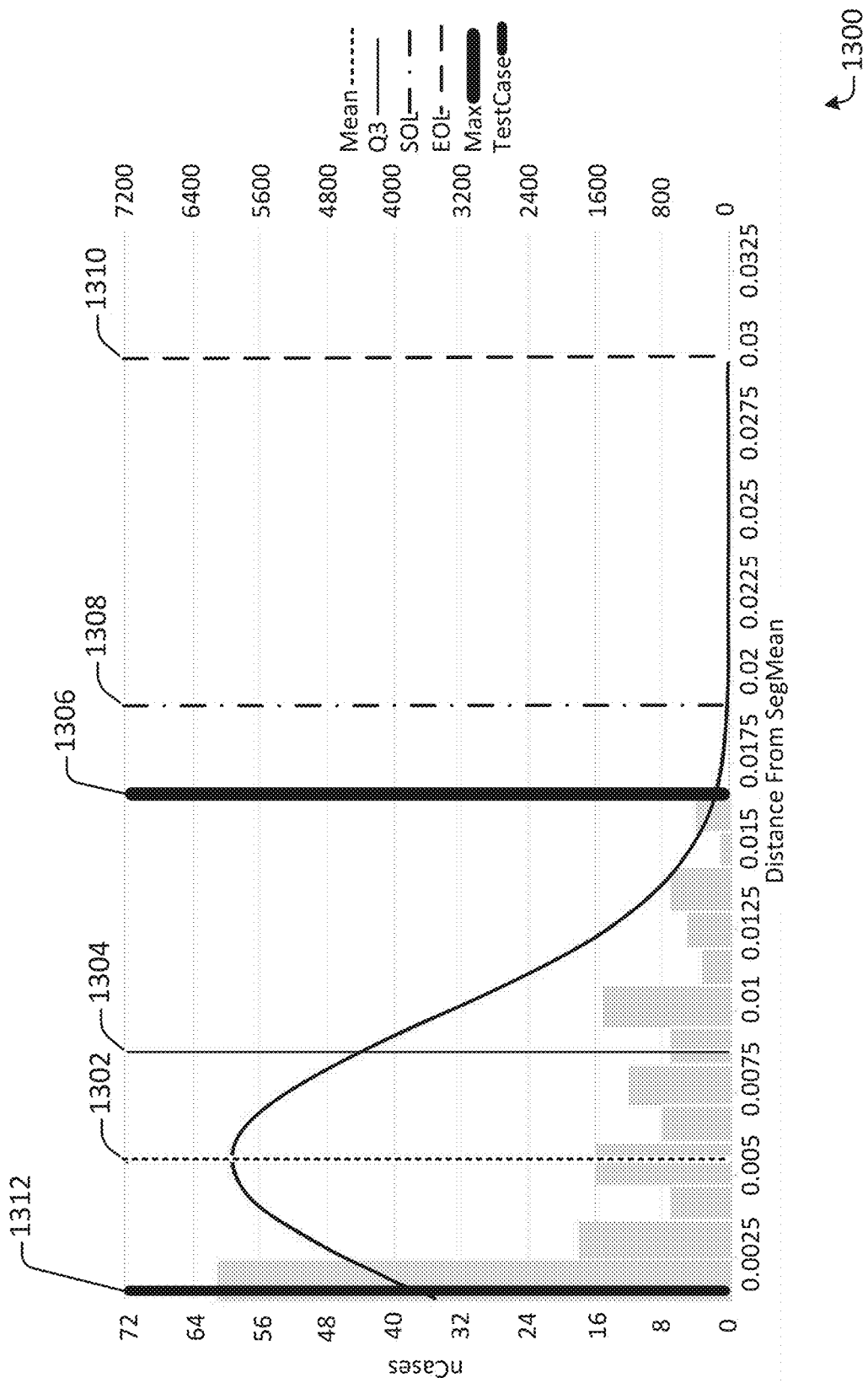
FIG. 13 illustrates a model feature distance density plot, generated in accordance with one or more embodiments.

FIG. 13 illustrates a model feature distance density plot 1300, generated in accordance with one or more embodiments. The model feature distance density plot 1300 illustrates the normalized distance to the segment mean of segment 4 for model feature values of data observations included within the segment. The feature distance density plot 1300 shows the distances for the mean 1302, third quartile 1304, maximum observed value 1306, suspected outlier limit 1308, and extreme outlier limit 1310 for model feature values of data observations associated with segment 4.

Figure 12:
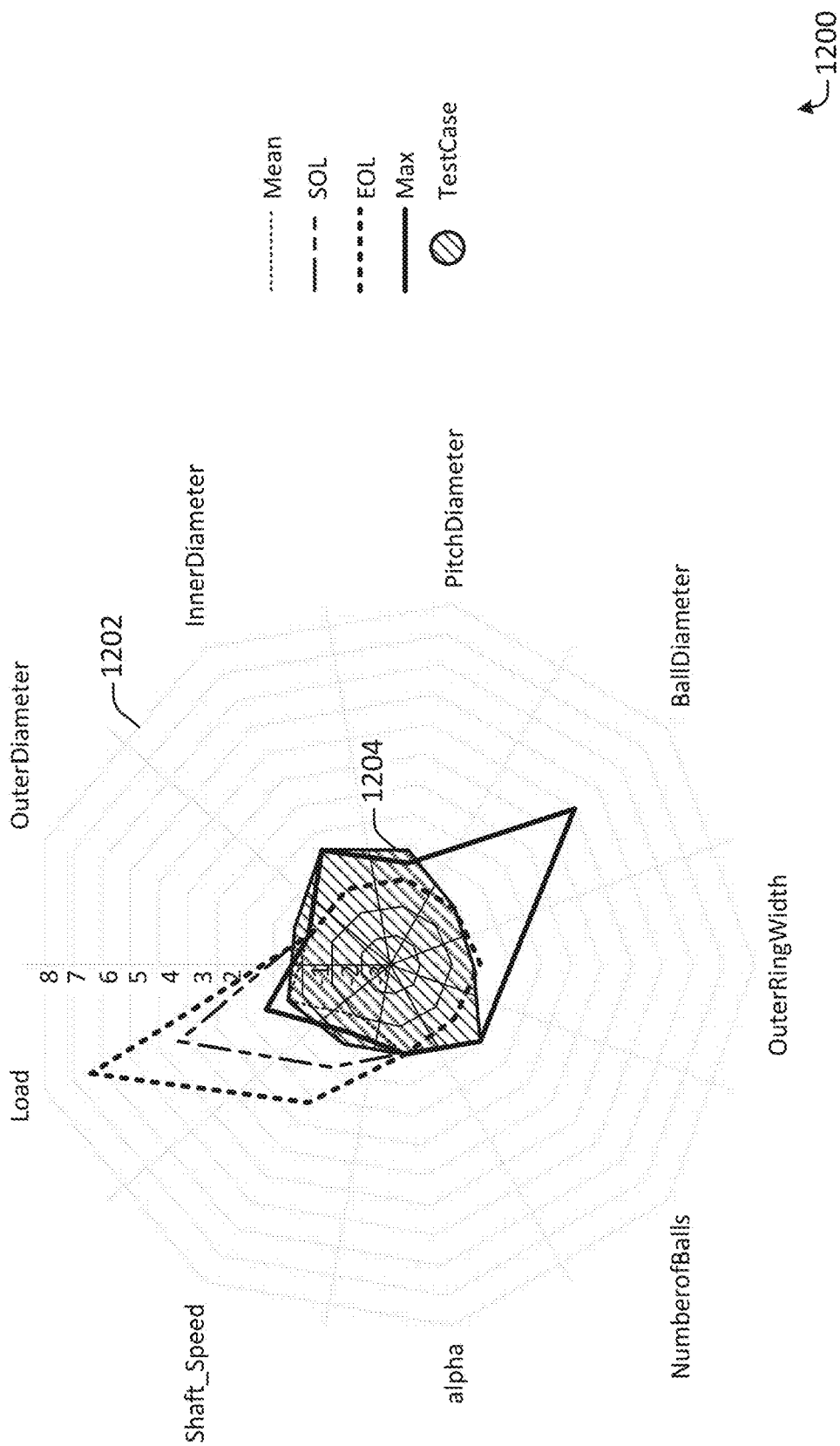
FIG. 12 illustrates a feature representation plot, generated in accordance with one or more embodiments.

In FIG. 13, the test data observation is illustrated at 1312. Because the value is very low, well-below the mean at 1302, the test data observation is near the center of segment 4. Thus, even though the test data observation differs from the observations in segment 4 along some dimensions, as shown in FIG. 12, overall the test data observation is near the center of the model feature subspace for segment 4 when considering all of the features represented in FIG. 13.

Figure 14:
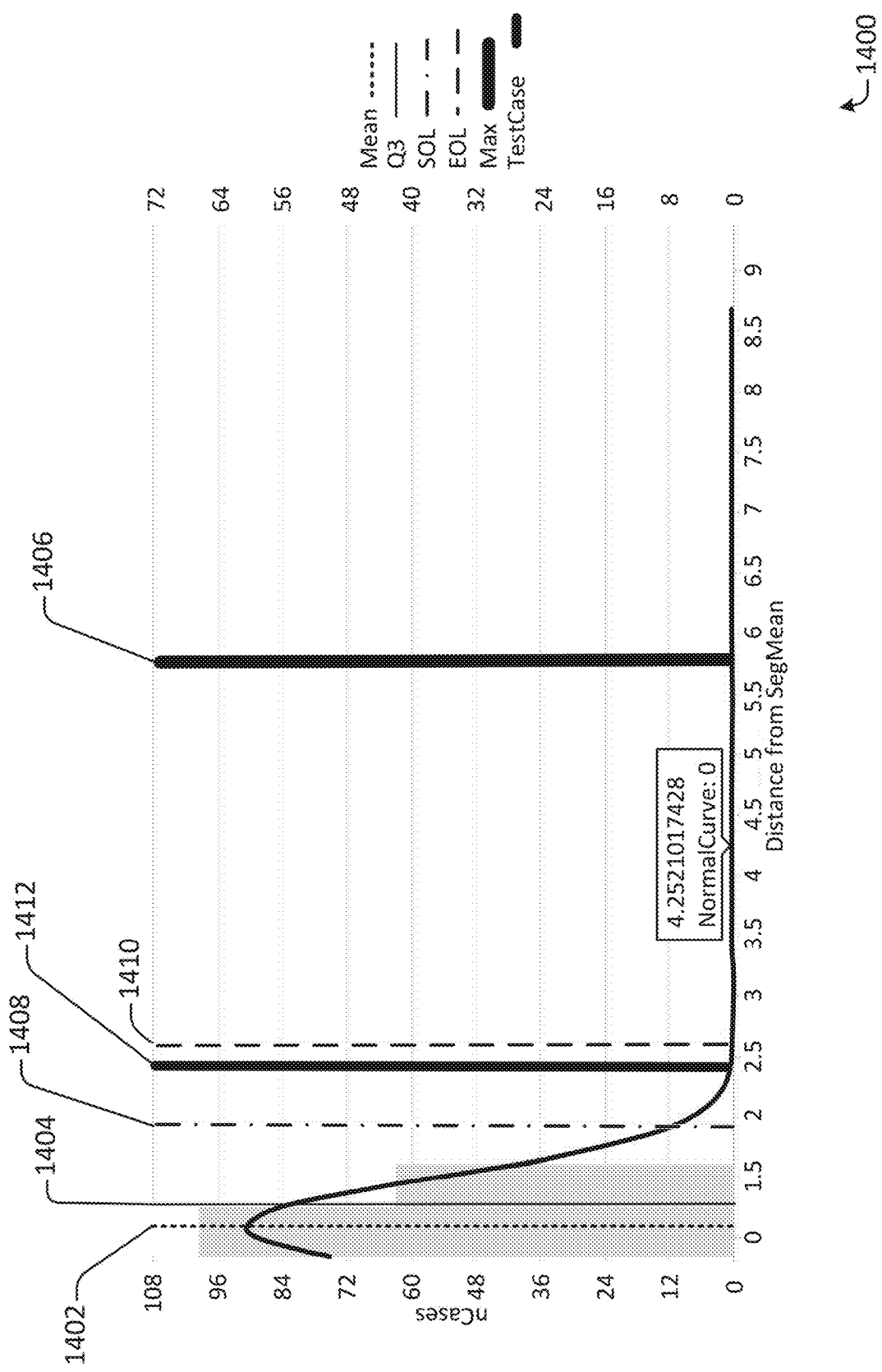
FIG. 14 illustrates a case attribute feature distance density plot, generated in accordance with one or more embodiments.

FIG. 14 illustrates a case attribute distance density plot 1400, generated in accordance with one or more embodiments. The case attribute distance density plot 1400 illustrates the normalized distance to the segment mean of segment 4 for case attribute values of data observations included within the segment. The case attribute distance density plot 1400 shows the distances for the mean 1402, third quartile 1404, maximum observed value 1406, suspected outlier limit 1408, and extreme outlier limit 1410 for case attribute values of data observations associated with segment 4.

In FIG. 14, the test data observation is illustrated at 1412. Because the value is above the mean 1402, the third quartile 1404, and the expected outlier limit 1408, its case attribute values are only partially represented in the case attribute values associated with the training data observations assigned to segment 4.

According to various embodiments, the distance from the means shown in FIG. 13 and FIG. 14 may be used to determine the model representation values shown in FIG. 9B. For instance, a value less than 2 standard deviations from the mean may be treated as well-represented, while values between 2 and 3 standard deviations from the mean may be treated as partially represented, and values greater than 3 standard deviations from the mean may be treated as misrepresented. However, these thresholds are only examples, and in practice different predetermined thresholds may be used, for instance to allow for stricter or more relaxed definitions of novelty.

Returning to FIG. 7, in some embodiments, a distance metric may be determined for one or more individual dimensions. For instance, a distance metric may be determined for particular features within a feature space associated with the unsupervised machine learning model. In such a situation, different distance metrics may be computed for different features.

FIG. 12 illustrates a feature representation plot 1200, generated in accordance with one or more embodiments. The feature representation plot 1200 shows a comparison of the test unit observation with the nearest segment in the training data according to one or more comparison features. In FIG. 12, the nearest segment to the test data segment is segment 4. Observations within the segment 4 have a 92.1% chance of being a defect.

The feature representation plot 1200 includes a web chart 1202 with regions that each correspond with a respective feature. The feature values for these features are standardized so as to be represented on the same scale. The standardized feature values for the test unit observation are shown at 1204. The web chart 1202 may plot various statistics for the training unit values included in the segment, such as the feature-specific mean, the third quartile, the suspected outlier limit, the extreme outlier limit, and the observed maximum value.

According to various embodiments, in the example shown in FIG. 12, the test case values fall outside of the limits identified for the segment 4 for several of the features (e.g., load and shaft speed) but fall within the limits identified for the segment 4 for several other features (e.g., pitch diameter and outer diameter).

Returning to FIG. 7, a determination is made at 712 as to whether to determine an additional distance metric. In some embodiments, additional distance metrics and visual representations may continue to be determined so long as additional metrics and visual representations are available. Distance metrics may be analyzed in parallel or in sequence, in any suitable order. Moreover, visual representations of the types shown in FIGS. 8 through 14 may be presented in a navigable user interface that allows a user to view different visualizations simultaneously and/or move between different visualizations in order to better understand the nature of the test data observation relative to the training data observations.

A determination is made at 714 as to whether to identify an additional unsupervised machine learning segmentation model. In some embodiments, additional models may continue to be selected until no additional models are available. Models may be analyzed in parallel or in sequence, in any suitable order.

Figure 11:
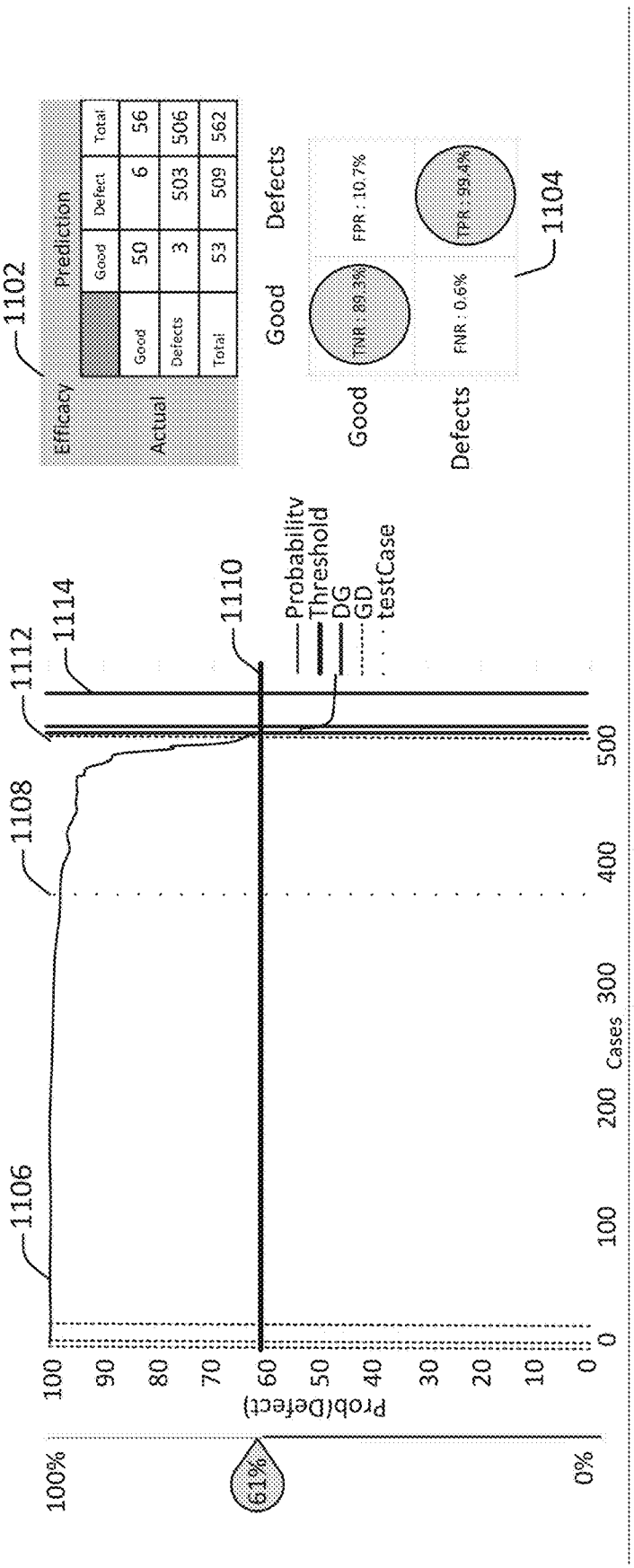
FIG. 11 illustrates a prediction model overview graphical user interface, configured in accordance with one or more embodiments.

If it is determined not to identify an additional unsupervised machine learning segmentation model, then a prediction model representation is determined at 716. FIG. 11 illustrates a prediction model overview graphical user interface 1100, configured in accordance with one or more embodiments. The prediction model overview graphical user interface 1100 includes a count-based confusion matrix 1102, a percentage-based confusion matrix 1104, and a prediction plot 1106.

According to various embodiments, the count-based confusion matrix 1102 illustrates the number of true positive predictions, true negative predictions, false positive predictions, and false negative predictions for the prediction model as applied to the training data using the designated threshold. For example, in FIG. 11, the model successfully predicted 50 bearings as good and successfully predicted 503 bearings as defective, while incorrectly predicting 3 bearings as good and incorrectly predicting 6 bearings as defective.

According to various embodiments, the percentage-based confusion matrix 11024 illustrates the percentage of true positive predictions, true negative predictions, false positive predictions, and false negative predictions for the prediction model as applied to the training data using the designated threshold. For example, in FIG. 11, the model exhibited a true negative rate of 89.3%, a false positive rate of 10.7%, a true positive rate of 99.4%, and a false negative rate of 0.6%.

According to various embodiments, the prediction plot 1106 plots the predicted probability of an observation being a defect on the y-axis against the observation number on the x-axis, with the observations being ordered in decreasing order of defect prediction. The test case, which as shown in FIG. 9B is associated with a predicted probability of defect of 96.5%, is illustrated at 1108. The predetermined probability threshold for declaring the test case to be a defect is shown at 1110. For comparison, false positive and false negative cases may be illustrated, for instance at 1112 and 1114 respectively.

Returning to FIG. 7, a graphical user interface is presented at 718. According to various embodiments, the graphical user interface may include one or more of the user interfaces and visual representations determined in FIG. 7. Such user interfaces and visual representations may be presented at the same time or within a navigable interface that allows a user to explore various viewpoints.

In some embodiments, the graphical user interface may include an overview of various information determined based on the models and/or test data observations discussed with respect to FIG. 7. For instance, FIG. 9A illustrates a model metrics graphical user interface 900, generated in accordance with one or more embodiments. The model metrics graphical user interface 900 may include a variety of information related to one or both of the machine learning models.

In some embodiments, the model metrics graphical user interface 900 may include information related to the supervised machine learning prediction model. For instance, the model metrics graphical user interface 900 may include information such as a predetermined threshold for prediction, the model concordance, and the F1 score for model performance.

In some embodiments, the model metrics graphical user interface 900 may include information related to the unsupervised machine learning classification model. For instance, the model metrics graphical user interface 900 may include information such as the number of segments, the model stability, and one or more multi-dimensional scaling parameters. The model stability may indicate, for instance, whether the same segments would be identified were the segmentation model to be retrained. For example, in FIG. 9A, 72% of the training data segments would likely to be located within the same segment were the model to be retrained.

FIG. 9B illustrates a model inference graphical user interface 950, generated in accordance with one or more embodiments. The model inference graphical user interface 950 may include information about the application of one or more or both of the machine learning models to the test data observation.

In some embodiments, the model inference graphical user interface 950 includes information related to the supervised machine learning prediction model. For instance, the model metrics graphical user interface 900 may include information such as an observation ID (e.g., "56_New"), the probability of defect (e.g., 96.5%), the predicted class (e.g., "Defect"), and the actual class (e.g., "Good").

In some embodiments, the model inference graphical user interface 950 may include information related to the unsupervised machine learning classification model. For example, the model inference graphical user interface 950 may include information such as the nearest segment to the test data observation. As another example, the model inference graphical user interface 950 may include one or more values indicating a level of representation of the test data observation, such as a score indicating a representation level determined based on model features and a score indicating a representation level determined based on case attributes, which may reflect the operating conditions under which the model features were measured. For instance, the one or more values may be z-values normalized based on the distance of the test case from the mean of the within-segment distance distribution of the corresponding features, as illustrated in FIG. 13 and FIG. 14. The model features may be converted to the power spectrum for the purpose of comparison and/or prediction.

In some embodiments, the model inference graphical user interface 950 may include an overall novelty score and/or category. For instance, the model inference graphical user interface 950 includes a novelty class of "Misrepresented", indicating that the test data observation has been automatically deemed misrepresented relative to the training data.

In some embodiments, the model inference graphical user interface 950 may include an overall recommendation as to how to handle the test data observation. For instance, the model inference graphical user interface 950 include a recommendation to review the test data observation.

In some embodiments, the overall recommendation may be based on one or more predetermined rules or heuristics. For example, a test data observation may be flagged for review if the predicted class differs from the actual class. As another example, a test data observation may be flagged for review if a novelty score, such as one computed on the basis of model features or case attributes, exceeds a designated threshold. As another example, a test data observation may be flagged for review if some combination of novelty scores (e.g., a weighted average) exceeds a designated threshold.

In some embodiments, the recommendation as to how to process the test data recommendation may depend on one or more of the values shown in FIG. 9B, as well as one or more pre-determined thresholds. For example, both the normalized model feature representation value and the normalized case attribute representation value may be compared with one or more respective predetermined thresholds. For instance, two thresholds may divide the possible representation values into three categories: well-represented, partially represented, and misrepresented.

In some embodiments, a test data observation may be identified as well-represented if the model prediction is accurate and if both the normalized model feature representation value and the normalized case attribute representation value are categorized as well-represented. In such a situation, the system may recommend that the test data observation be archived since it is already reflected in the training data used to train the models.

In some embodiments, a test data observation may be identified as represented if at least one of the normalized model feature representation value and the normalized case attribute representation value is categorized as well-represented, and neither the normalized model feature representation value nor the normalized case attribute representation value is categorized as misrepresented. In such a situation, the system may recommend that the test data observation be used to self-heal the models by adding it to the training data on a subsequent training iteration.

In some embodiments, a test data observation may be identified as misrepresented if at least one of the normalized model feature representation value and the normalized case attribute representation value is categorized as misrepresented, or if both the normalized model feature representation value and the normalized case attribute representation value is categorized as partially represented, or if the model prediction is inaccurate. In this case, the test data observation may be identified for manual review, for instance by a systems administrator.

In some embodiments, the model metrics graphical user interface 950 may be configured so as to facilitate user input. For example, a user may click the thumbs up or thumbs down button to change the actual class to match or differ from the predicted class. As another example, the user may click the recommendation button to perform an action such as changing the course of action or applying the recommended course of action. Alternatively, or additionally, user input may be provided in a different way, such as outside the graphical user interface.

In some embodiments, one or both of the graphical user interfaces shown in FIG. 9 may be provided as popup windows or overlain windows that are presented in conjunction with one or more other user interfaces, such as the novelty overview graphical user interface 800 shown in FIG. 8.

Returning to FIG. 7, user input is received at 720. In some embodiments, the user input may indicate how to employ the test data observation. For example, the user input may indicate that the test data observation should be used to update the prediction and/or segmentation models. As another example, the user input may indicate that the test data observation should be manually reviewed for accuracy. As yet another example, the user input may indicate that the test data observation should be ignored and not used to update one or more models.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
   determining a designated feature data segment of a plurality of feature data segments by applying a feature segmentation model to a test data observation via a processor, the feature segmentation model being pre-trained via a plurality of training data observations, the feature segmentation model dividing the plurality of training data observations into the plurality of feature data segments;
   determining a predicted target value by applying a prediction model to a test data observation via a processor, the prediction model being pre-trained via the plurality of training data observations, the test data observation including one or more values determined based on sensor data collected from a mechanical device;
   determining one or more distance metrics, each of the one or more distance metrics representing a respective distance between the test data observation and the designated feature data segment along one or more dimensions;

determining a feature novelty value based on the predicted target value, the designated feature data segment, and the distance metrics;

based on the feature novelty value, classifying the test data observation as belonging to a designated one of a plurality of novelty classes including a first class indicating that an observation is well-represented among the training data observations and a second class indicating that an observation is unrepresented among the training data observations;

transmitting via a communication interface a first instruction to generate a graphical user interface for the test data observation, the graphical user interface including the designated novelty class and a graphical representation of a subset of the one or more distance metrics;

receiving user input via the generated user interface, the user input including a second instruction to update the prediction model and the feature segmentation model; and determining an updated prediction model and an updated feature segmentation model that both incorporate the test data observation and the training data observations, the updated prediction model predicting a performance characteristic of the mechanical device.

2. The method recited in claim 1, wherein the generated user interface includes a density plot that plots a designated distance metric in relation to a plurality of comparison distance metrics corresponding to respective ones of the training data observations.

3. The method recited in claim 1, wherein the generated user interface includes a multi-dimensional scaling plot that plots a designated distance metric in relation to a plurality of comparison distance metrics corresponding to respective ones of the training data observations.

4. The method recited in claim 1, wherein the test data observation includes a case attribute vector, the case attribute vector including one or more metadata values characterizing the test data observation, and wherein the generated user interface includes a feature representation plot that illustrates a respective one or more statistics computed for each of a plurality of feature representation distance metrics, each of the statistics corresponding to a respective one of the metadata values.

5. The method recited in claim 1, wherein the test data observation includes a feature vector including a plurality of feature values corresponding with a respective plurality of features associated with the prediction model, and wherein applying the feature segmentation model to the test data observation comprises applying the feature segmentation model to the feature vector, and wherein the generated user interface includes a feature representation plot that illustrates a respective one or more statistics computed for each of a plurality of feature representation distance metrics, each of the statistics corresponding to a respective one of the feature values.

6. The method recited in claim 1, wherein the plurality of novelty classes includes a third class indicating that an observation is under-represented among the training data observations.

7. The method recited in claim 1, wherein the generated user interface includes a model updating recommendation determined based at least in part on a test data observation novelty value indicating a degree of novelty of the test data observation relative to the plurality of training data observations.

8. The method recited in claim 1, the method further comprising:

determining an actual target value for the test data observation, wherein the updated prediction model is determined at least in part based on the actual target value, and wherein the generated user interface includes a feature novelty value determined at least in part based on the actual target value.

9. One or more non-transitory computer readable media having instructions stored thereon for performing a method, the method comprising:

determining a designated feature data segment of a plurality of feature data segments by applying a feature segmentation model to a test data observation via a processor, the feature segmentation model being pre-trained via a plurality of training data observations, the feature segmentation model dividing the plurality of training data observations into the plurality of feature data segments;

determining a predicted target value by applying a prediction model to a test data observation via a processor, the prediction model being pre-trained via the plurality of training data observations, the test data observation including one or more values determined based on sensor data collected from a mechanical device;

determining one or more distance metrics, each of the one or more distance metrics representing a respective distance between the test data observation and the designated feature data segment along one or more dimensions;

determining a feature novelty value based on the predicted target value, the designated feature data segment, and the distance metrics;

based on the feature novelty value, classifying the test data observation as belonging to a designated one of a plurality of novelty classes including a first class indicating that an observation is well-represented among the training data observations and a second class indicating that an observation is unrepresented among the training data observations;

transmitting via a communication interface a first instruction to generate a graphical user interface for the test data observation, the graphical user interface including the designated novelty class and a graphical representation of a subset of the one or more distance metrics;

receiving user input via the generated user interface, the user input including a second instruction to update the prediction model and the feature segmentation model; and determining an updated prediction model and an updated feature segmentation model that both incorporate the test data observation and the training data observations, the updated prediction model predicting a performance characteristic of the mechanical device.

10. The one or more non-transitory computer readable media recited in claim 9, wherein the generated user interface includes a density plot that plots a designated distance metric in relation to a plurality of comparison distance metrics corresponding to respective ones of the training data observations.

11. The one or more non-transitory computer readable media recited in claim 9, wherein the generated user interface includes a multi-dimensional scaling plot that plots a designated distance metric in relation to a plurality of comparison distance metrics corresponding to respective ones of the training data observations.

12. The one or more non-transitory computer readable media recited in claim 9, wherein the test data observation includes a case attribute vector, the case attribute vector including one or more metadata values characterizing the test data observation, and wherein the generated user interface includes a feature representation plot that illustrates a respective one or more statistics computed for each of a plurality of feature representation distance metrics, each of the statistics corresponding to a respective one of the metadata values.

13. The one or more non-transitory computer readable media recited in claim 9, wherein the test data observation includes a feature vector including a plurality of feature values corresponding with a respective plurality of features associated with the prediction model, and wherein applying the feature segmentation model to the test data observation comprises applying the feature segmentation model to the feature vector, and wherein the generated user interface includes a feature representation plot that illustrates a respective one or more statistics computed for each of a plurality of feature representation distance metrics, each of the statistics corresponding to a respective one of the feature values.

14. The one or more non-transitory computer readable media recited in claim 9, wherein the plurality of novelty classes includes a third class indicating that an observation is under-represented among the training data observations.

15. The one or more non-transitory computer readable media recited in claim 9, wherein the generated user interface includes a model updating recommendation determined based at least in part on a test data observation novelty value indicating a degree of novelty of the test data observation relative to the plurality of training data observations.

16. A system configured to perform a method, the method comprising:
  determining a designated feature data segment of a plurality of feature data segments by applying a feature segmentation model to a test data observation via a processor, the feature segmentation model being pre-trained via a plurality of training data observations, the feature segmentation model dividing the plurality of training data observations into the plurality of feature data segments;
  determining a predicted target value by applying a prediction model to a test data observation via a processor, the prediction model being pre-trained via the plurality of training data observations, the test data observation including one or more values determined based on sensor data collected from a mechanical device;
  determining one or more distance metrics, each of the one or more distance metrics representing a respective distance between the test data observation and the designated feature data segment along one or more dimensions;
  determining a feature novelty value based on the predicted target value, the designated feature data segment, and the distance metrics;
  based on the feature novelty value, classifying the test data observation as belonging to a designated one of a plurality of novelty classes including a first class indicating that an observation is well-represented among the training data observations and a second class indicating that an observation is unrepresented among the training data observations;
  transmitting via a communication interface a first instruction to generate a graphical user interface for the test data observation, the graphical user interface including the designated novelty class and a graphical representation of a subset of the one or more distance metrics;
  receiving user input via the generated user interface, the user input including a second instruction to update the prediction model and the feature segmentation model; and
  determining an updated prediction model and an updated feature segmentation model that both incorporate the test data observation and the training data observations, the updated prediction model predicting a performance characteristic of the mechanical device.

* * * * *